Oct. 20, 1936.　　R. D. ELLIOTT ET AL　　2,057,887
CLARIFYING LIQUID
Filed Oct. 15, 1932　　3 Sheets-Sheet 1
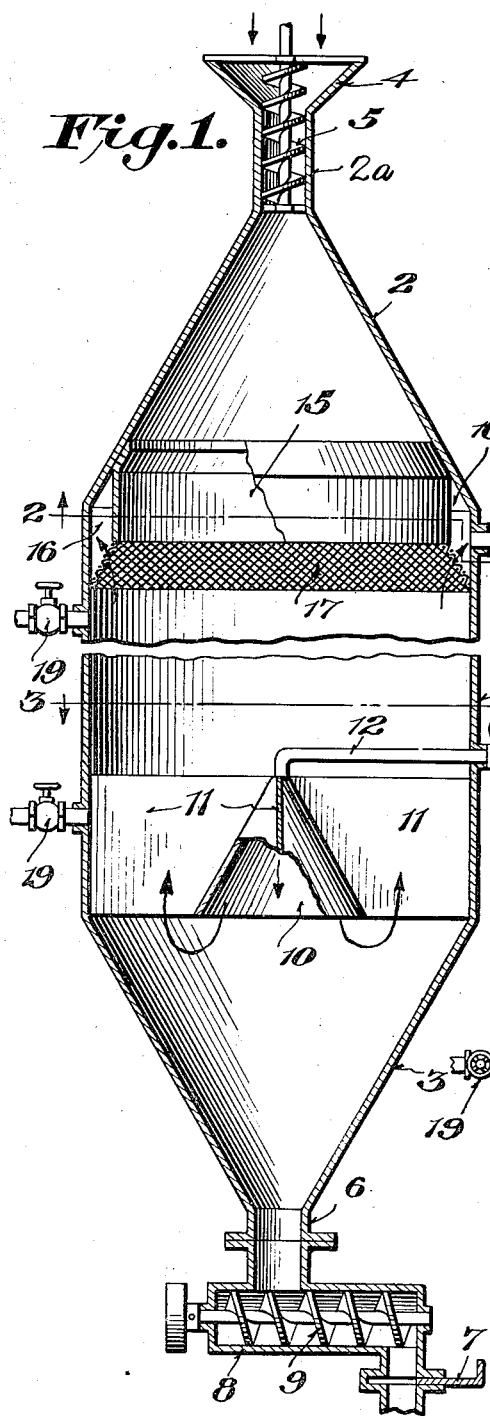
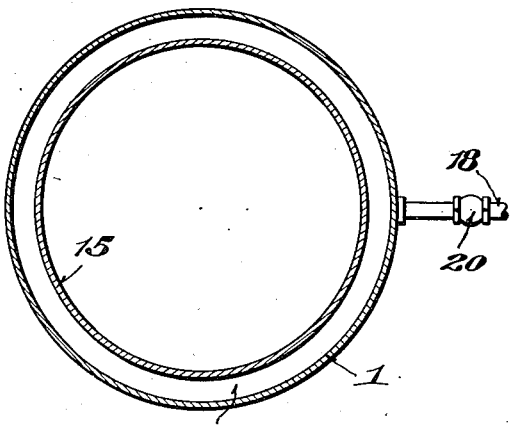
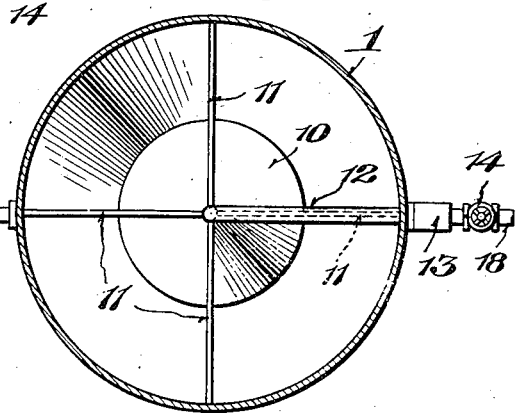
Inventors
R. D. Elliott,
M. J. Elliott,
By K. P. McElroy
Attorney

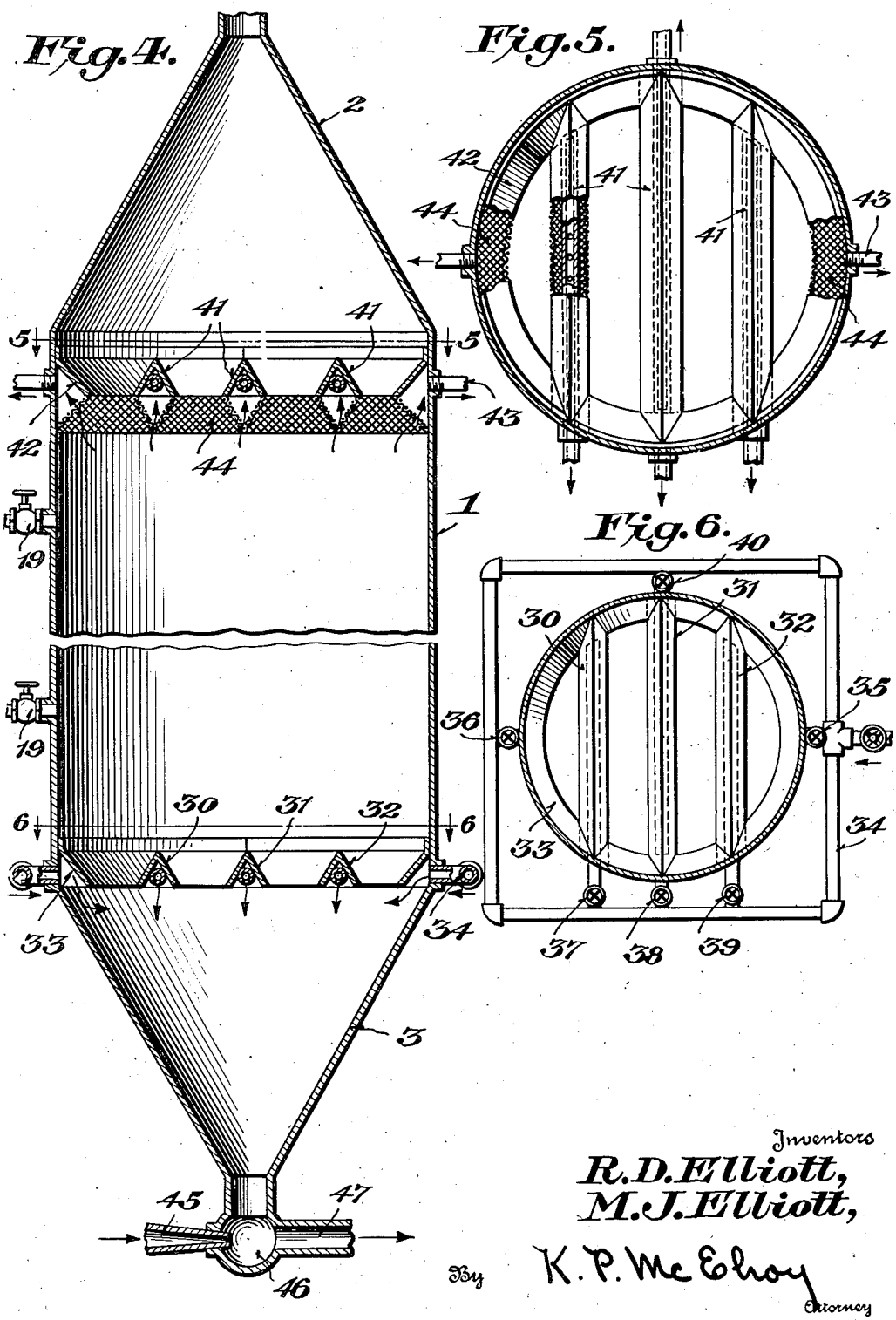

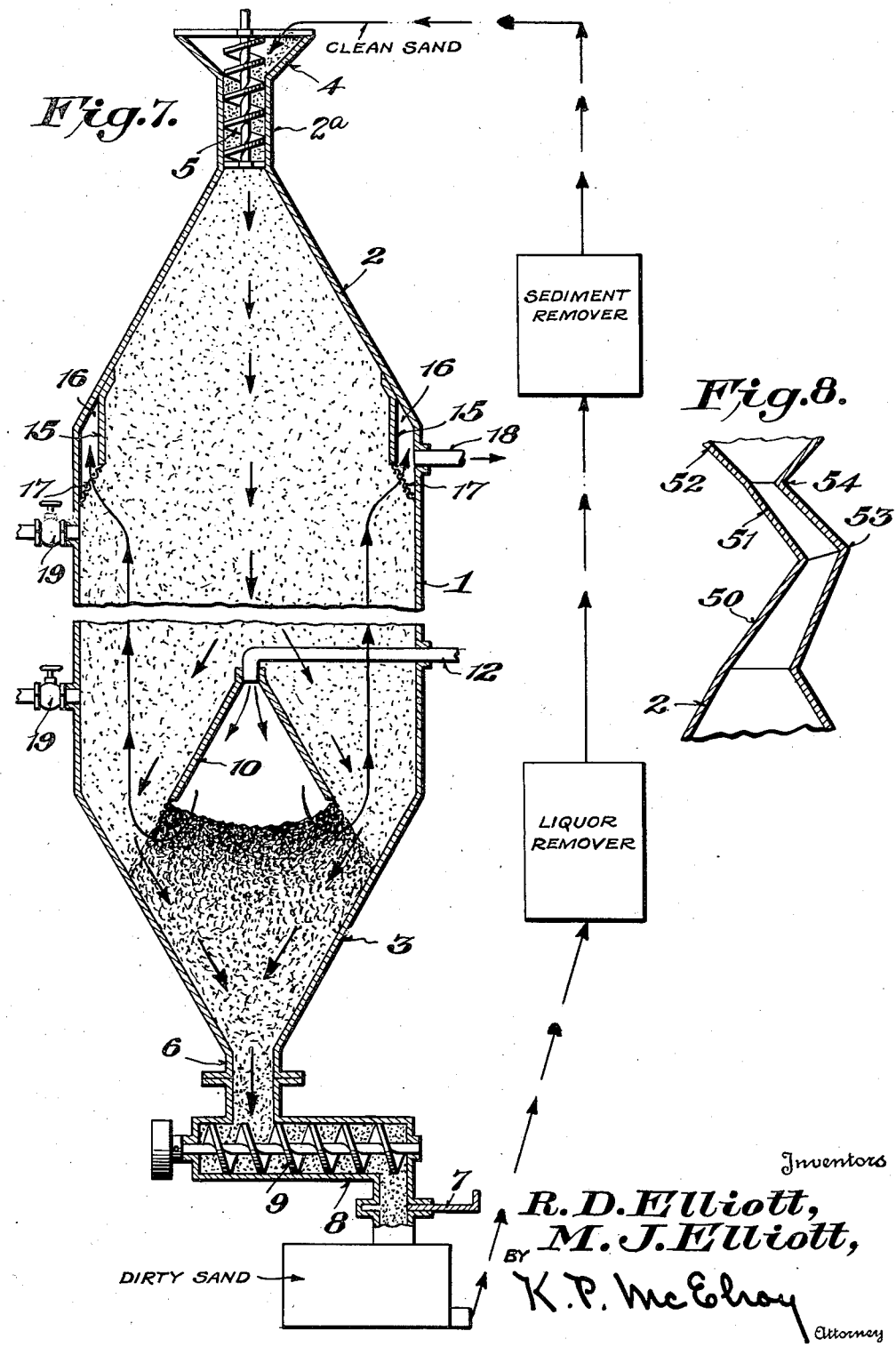

Patented Oct. 20, 1936

2,057,887

UNITED STATES PATENT OFFICE 2,057,887

CLARIFYING LIQUID

Roy D. Elliott and Mary J. Elliott, Jersey City, N. J.

Application October 15, 1932, Serial No. 638,030

13 Claims. (Cl. 210—141)

This invention relates to clarifying liquids; and it comprises a method of clarifying and filtering turbid liquids carrying suspended matter, said method comprising establishing and maintaining a column of sand or other granular filtering medium of substantial height in slow downward movement through a casing having a sand inlet at the top and a sand outlet at the bottom, establishing and maintaining an upwardly presented face of constantly changing sand coming from said column and in free communication therewith, and passing turbid liquid under pressure downward through said face and thence upward through the moving column of sand to a point of exit; and it also comprises as a new organization of apparatus elements a casing adapted to hold a moving body of sand, means for supplying sand at or near the top under such pressure as may be desired, means for removing sand at the bottom, means for removing filtered liquid below the top of the column of sand, an open bottomed distributing casing in the path of or adjacent to the downwardly moving sand and means for supplying turbid liquid under pressure to said distributing casing; all as more fully hereinafter set forth and as claimed.

Rapid and efficient clarification of turbid liquids is a problem in many arts. Filtration is generally used and often pervious bed filters charged with sand or other granular filtering material are used. Filtration is generally downward, upward filtration being little used, except with locked filter beds; that is, beds held in place. With a bed having a free upper surface, upward filtration must be slow and pressures low to avoid channeling and uneven passage of liquid. With down flow and a pervious filter bed having a free upper face, the use of higher pressure to accelerate percolation is practicable. The primary filtering effect is due to deposited sediment in and on the upper free face and after the upper free face is partially coated by sediment, most of the resistance to passage of liquid occurs at this point. Penetration becomes uniform; sediment depositing preferentially at any point of low resistance. Filtration through a mixture of sand and the sediment deposited from any particular liquid followed by filtration through clean sand, is more efficient in removing sediment from the rest of the liquid than is filtration through clean sand alone. Partial clogging of the upper layer in a downflow filter is therefore desirable, provided the clogging does not go so far as to cause impractically slow percolation.

With the ordinary types of downflow sand filters, operation must be stopped when the free face above the sand accumulates too much sediment, that is, when the free face becomes too little pervious. At this time, it is customary to backwash the sand bed, that is, to send a current of water through it in the reverse direction to detach and float sediment and to clean the sand. This backwashing, while practicable in filtering water, is not so practicable where other and more valuable liquids are to be filtered. The filter bed is full of liquid when cleaning becomes necessary and it is often desirable not to lose this liquid or to dilute it.

In the present invention we use a mixed operation, obtaining the advantages of downflow in filtering, while obviating the discontinuity of operation incident to the use of ordinary downflow filters. Operation being continuous, backwashing is not practiced; nor is there any occasion to waste or dilute valuable liquid in the filter. In the present method of operation we establish and maintain a slow downward flow of sand through a vertical casing. In the path of, or adjacent to, this moving body of sand and near its base, we place an open-bottomed casing having means at its top for introducing liquid to be filtered under pressure. The moving body of sand extends under this open bottomed casing and may enter it slightly. With a sufficient pressure of sufficiently turbid liquid entering the top of the casing, a horizontal, or nearly horizontal, sand face of constantly changing material is established and maintained below the open bottomed casing. We generally correlate conditions so that the face is nearly horizontal but it may be, and often is, dished or coned somewhat. On introducing liquid under pressure into this open bottomed casing it presses downward against the sand face, filtering therethrough. Accumulated sediment plugs this face or forms a layer or film over it, as the case may be. There is a considerable pressure drop below this film and it tends to be of even perviousness for this reason; the most sediment depositing at the point where penetration is greatest. This open bottomed casing may at will be regarded as a sand guard, a distributing chamber, a pocket-forming chamber, or filtering surface forming chamber. The liquid passing downward through the horizontal face of sand is prefiltered by a layer of sediment. It then passes outwardly and up through the downwardly moving column of sand; passage being in countercurrent. Considered as a distributing device, the open bottomed casing insures even distribution of liquid to all points in the column of sand. With many liquids, as a layer of sediment accumulates on the horizontal face penetration becomes difficult and with these liquids we generally correlate the downward passage of sand with the pressure and rate of flow of incoming liquid so as to insure that in the horizontal face there shall be the proper amount of sediment, neither more nor less, which will insure a bright filtrate with reasonable rapidity of operation.

In most filtration operations, clean silica sand is a desirable material to use as a filter medium. However, many other granular materials are used for special reasons and for special purposes. Granular boneblack, granulated marble, granulated silicates of one kind or another, bauxite, pumice, phosphate rock, coral sand, granulated metal or other mineral or metallic substances, coke, granular fuller's earth, zeolite, crushed glass, silica gel etc., may be used for special purposes. Granulated rocky gangue particles resulting in obtaining asbestos of the amphibole or serpentine type are useful for a number of purposes, because of their fibrous nature. All these substances are included in the term "sand" whenever used. The nature of the filtering medium to be used naturally depends largely on the character of the material to be filtered. Quartz sand is suitable for water, sewage, etc., while marble is better for clarifying alkaline solutions, such as those resulting from treating water by soda-lime purifying methods. With sugar solutions, granulated bone char is often desirable in that by its use both clarification and decolorization are simultaneously effected. Granulated phosphate rock also is sometimes desirable in filtering sugary liquids. In the various industrial arts, wherein filtration is practiced, we find liquids of a great variety of physical and chemical properties and their suspended particles vary greatly in size, shape and form. Some liquids have coarse granular rigid particles which are usually easily filtrable, other liquids have soft, shapeless, gel, or slime-like solids in suspension. Some liquids contain solids of colloidal fineness and other liquids contain suspended matter of mixed classifications. Liquids containing suspended matter of very fine nature are often treated by some chemical, physical, or fermentation process for the purpose of causing an agglomeration, or flocculation, of this fine turbid suspension in order to promote ease of filtration. Adjustment of pH value is often resorted to. In our invention these methods of pretreating liquids so as to increase their filtrability may be practiced if desired. In some special cases the nature of the liquid or the process of manufacture may not permit of a treatment which will insure that these liquids are easily filtrable; in other words, it is sometimes necessary to filter liquids that contain suspended matter in such a condition that it tends to pass through a filter medium sufficiently pervious to give a rapid rate of flow. Such suspended matter may partially pass along with the liquid through the filter medium particularly if the pressure is too high. In order to overcome this difficulty, we sometimes make use of the novel method which consists of coating the grains of sand, or other filter media, with suitable substances such as rosin or other resin, rubber, gum chicle, cellulose nitrates, aluminosilicates, asphaltum, tar, etc. These substances tend to increase the retentive power of the filter medium and they permit incorporating on the surface of the sand grains substances neutralizing the electric charges of colloids in suspension in the particular liquid filtered. Instead of coating the grains of sand with said substances, we sometimes employ an alternate method which accomplishes the same result and which consists of adding a solution of sand coating substances in an appropriate solvent, to the liquid to be filtered thus converting the suspended matter into a sticky, or adhesive, mass which has no tendency to pass even relatively coarse filter media.

In the accompanying drawings we have shown, more or less diagrammatically, certain apparatus within our invention and useful in performing our processes. In this showing:

Fig. 1 is a central vertical section; certain parts being in elevation;

Fig. 2 is a horizontal section along line 2—2 of Fig. 1 looking in the direction of the arrows;

Fig. 3 is a horizontal section taken along line 3—3 of Fig. 1 looking in the direction of the arrows;

Fig. 4 is a central vertical section of a modification of the apparatus of Fig. 1;

Fig. 5 is a horizontal section taken along line 5—5 of Fig. 4 looking in the direction of the arrows;

Fig. 6 is a horizontal section taken along line 6—6 of Fig. 4 looking in the direction of the arrows;

Fig. 7 is a diagrammatic view in the nature of a flow sheet showing the circulation of liquid and of sand through the apparatus of Figs. 1 and 4 and also through certain accessory apparatus; and Fig. 8 is a fragmentary view showing in vertical section a modification of the sand feed at the top of the apparatus of Figs. 1 and 4.

In the showing of the various figures, element 1 is a casing which may be of any suitable material but generally is iron or steel, heat insulated if desired. In the showing of Fig. 1 this casing is shown coned at top and bottom, respectively indicated as 2 and 3. At the top, 2 is shown as continued as cylindrical casing 2$^a$ funneled at 4. Within this cylindrical casing is a screw feed device 5. The bottom cone is continued as a cylindrical casing 6 communicating with screw conveyor casing 8, containing screw conveyor 9 actuated by a source of power not shown. The screw conveyor casing 8 is provided with a gated shut-off 7. Within the casing is shown mounted a liquid distributing device 10 of a generally conical shape and open at the bottom. As shown, this is hung on struts 11 and forms a pocket into which liquid to be filtered is introduced, as hereafter described. Communicating with the interior of this distributing casing and the pocket formed thereby is liquid inlet conduit 12 provided with pressure gauge 13 and having valve 14. This liquid distributor is shown as at a point near the lower end of the casing 1. At an upper point in the casing are liquid withdrawal means comprising an annular member 15 defining a peripheral liquor passage 16 between it and the main casing. At the bottom, this annular member is provided with a screen member 17 preventing entrance of sand to the annular passage. Communicating with the annular passage is liquid withdrawal pipe 18 provided with valve 20.

In Fig. 4 the upper sand feed is shown broken away. The casing is the same as in Fig. 1. But instead of providing a single distributing chamber (10) provision is made for introduction of liquid at a plurality of points. As shown, see Fig. 6, the casing is crossed by a plurality of distributors, three being shown and marked respectively 30, 31 and 32. In addition, the casing is provided with a peripheral annular louvre 33. These distributing elements are located, as before, at a low point in the casing but well above the bottom sand removing device. The transverse elements 30, 31, 32 and the louvre 33 have open bottoms and are closed at the tops. Liquid is fed to the louvre and the transverse elements by a bustle pipe 34 communicating with the peripheral louvre through valved connections 35, 36 and 38 and with the transverse distributing elements through connections 37, 39 and 40. Similarly, at a high point in the casing a plurality of liquid withdrawal means are provided; these also having the form of transverse elements having an inverted trough form. The transverse withdrawal elements are all marked 41. Connecting with the top of each of these trough elements and with a peripheral louvre 42 is a liquid withdrawal conduit 43 going to a bustle pipe (not shown). The bottom of the louvre and the bottom of each of the inverted trough elements is provided with a screen member 44.

In the structure of Fig. 1, sand withdrawal from the bottom of the casing is provided for by screw conveyor. In the structure of Fig. 4 sand is withdrawn by an ejector connection 45 opening into chamber 46 and discharging through outlet conduit 47.

In the operation of filters utilizing the present invention for anything except water, it is in general necessary that occluded liquid be removed from discharged sand with as little dilution as possible. It is also necessary in all embodiments of the present invention, that the withdrawn sand be freed of sediment and cleaned for return and reuse. In Fig. 7 is a diagrammatic showing in the nature of a flow sheet showing the circulation of sand and of liquid through a filter apparatus under the present invention and also an accessory circulation of dirty sand from the bottom of the casing through liquor removing means and through sediment removing means with return of the clean sand to the apparatus to serve anew.

In the showing of Fig. 7 the individual arrows show the circulation of sand while the connected arrows show circulation of liquid.

In Fig. 8 is shown a modification of the sand introducing means for Figs. 1 and 4 wherein friction and weight of sand are relied upon instead of using the positive sand introducing means of Fig. 1. In Fig. 8 the upper portion (2) of Fig 1 is continued as a zig-zag conduit, shown as two sections 50 and 51 communicating with a hopper 52. As many of these zig-zag sections may be used as is necessary to get the desired height of sand and friction. As shown this passage is restricted at 53 and 54.

In the use of the apparatus of Fig. 1 in the described process of filtering, a downwardly moving column of sand is established and maintained in casing 1. The column may be under positive pressure afforded by forced feed or its downward movement may be by gravity only. In either event, the sand in the lower portion of the column is compacted and forms a good filtering medium. Near but above the base of the column an extensive area available for downflow filtration is afforded by open bottomed pocket-forming casing 10. A pocket is formed in the main body of moving sand at a relatively low point, such pocket forming a port of introduction for liquid to be filtered. There is therefore established a primary zone of filtration, (filtration being downward) and a secondary zone of filtration, (filtration being upward), with constant removal of sand from the primary zone, so that the vertically presented face is continuously renewed. Filtration is accomplished as in any downflow filter first through a layer of settled sediment, then through a layer of sand plugged with sediment and finally through sand, with the difference that the filtration is a continuous operation. There is no necessity of stopping operation to remove accumulations of sediment and to clean the sand as in other downflow filters. Instead, sand and sediment are removed at a point below the filtering face going to exit through 8, and replaced by clean sand from the upper column. In effect, the filtering face is constantly changing at a rate dependent on the necessity. In practice the rate of sand flow is so adjusted as to obtain a bright filtrate from any given turbid liquid with a reasonable pressure of turbid liquid and with the removed sand carrying a large proportion of sediment. Another difference over the usual downflow filter is that part of the flow of the liquid is upward. The coned shape of the bottom of the casing tends to compact the mixture of sand and sediment reducing the free space for liquid. A minimum of liquid is carried out of the system through 8.

When a forced feed of sand is used the sand functions in the way analogous to that of a locked bed filter except, of course, that the sand of the filter is constantly changing. With such a feed practically any pressure can be used on the turbid liquid entering through the pocket formed by casing 10. Under certain conditions it may be desirable to apply suction to outlet 18.

In operation, a correlation can readily be found between the speed of flow of sand through the system, determined by conveyor 9 and conveyor 5 and the pressure differential between 13 and 18 which will give rapid filtration with delivery of a bright filtrate through 18.

It is at times desirable to use other agents in connection with the sand, as for instance, decolorizing carbon. In so doing, decolorizing carbon can be introduced with the sand and will travel down the system in counter-current to the liquor, its decolorizing power being completely exhausted. Sometimes it is desirable to introduce fine decolorizing carbon at a point between the inlet and the outlet through a suitable inlet (not shown). A filter aid can be introduced with the liquid entering through pipe 12.

Where possible, it is desirable to obtain a discharge mixture consisting of about equal parts of sand and sediment. Except where filtering water, it is in general necessary to recover entrained liquid in this mixture. There is not much, but there is some. In the diagrammatic showing of Fig. 7 it will be noted that the dirty sand passes through a liquor removing device and thence through a sediment removing device. Sometimes it is desirable that the clean sand coming from the sediment removing means be dried before re-entry in hopper 4. Sometimes this is not necessary or desirable.

In the showing of Fig. 4, a plurality of distributing devices is shown. Where it is desirable to introduce chemical bodies of one kind or another, one or more distributing devices may be located above 30, 31 and 32 for this purpose and inlets to these are diagrammatically shown as valved pipes 19.

The tanks of Figs. 1 and 4 and in the flow sheet of Fig. 7 are shown as cylindrical with conical tops and bottoms, but it is, of course, to be understood that other forms of apparatus may be used, such, for instance, as rectangular tanks with pyramidically shaped tops and bottoms and instead of having each tank constitute one filtering unit, it may of course, be divided by suitable partitions or the like, providing several independently functioning units.

In a specific embodiment of the present invention raw sugar was dissolved to a 60 per cent solution and defecated in one of the usual ways; in this instance by the addition of a solution of calcium superphosphate and milk of lime with a final adjustment of the pH to 7.3. The turbidity of the defecated solution was rather flocky in nature. The turbid solution was fed into the sand filled apparatus of Fig. 1 through pipe 12 entering cone 10. Introduction at first was slow to allow the formation of a slight film on the face of the pocket of sand formed by the cone. The pressure was gradually increased and introduction of liquor continued until bright filtered liquid passed out at 18. At this moment, of course, there was a slight differential pressure within and without the distributor 10. The actual pressure on the liquid entering through 12 was about 5 pounds. About 3 pounds per square inch were required to overcome the hydrostatic head of the upflowing liquid in the sand column, friction, etc. The temperature of the solution and of the whole system was maintained around 80° C. At first the sand was not kept in movement. The pressure built up until gauge 13 showed equivalent to 20 pounds pressure. At this time, an efficient sediment plugged filtering surface had been produced and movement of the sand was started, a mixture of sediment and sand being removed at the bottom and clean sand supplied through the forced feed at the top. Thereafter, the downward flow of sand was so regulated as to maintain a pressure, shown at 13, of about 20 pounds. Operating thus, the mixture removed with the sand carried about equal volumes of sand and wet sediment.

What we claim is:—

1. In filtering turbid liquids the continuous process which comprises establishing and maintaining a downwardly moving column of compacted granular filtering material, establishing and maintaining in said column an upwardly presented face of changing granular material derived from a low point in said column, delivering liquid to be filtered under pressure downward to and through said face and removing filtered liquid from a high point in said column.

2. In the process of claim 1, correlating the speed of movement of the granular material with the pressure and rate of flow of incoming liquid so as to deposit and maintain on said upwardly presented face a layer of sediment sufficiently thick to insure bright filtration but not thick enough to interfere with free permeability and rapid filtration.

3. In filtering turbid liquids, the continuous process which comprises delivering turbid liquids under pressure downwardly into and through an upwardly presented constantly renewed face formed in a downwardly moving body of granular filtering material and then passing the filtered liquid upwardly through a portion of said downwardly moving body above said pocketed face.

4. In filtering turbid liquids the continuous process which comprises transmitting such liquids under pressure first downwardly through a downwardly moving column of granular pervious material and then upwardly therethrough, the pressure of said material being sufficient to maintain a substantially upwardly presented face of the granular material at the point of introduction of the liquid and the speed of movement of the granular material in its downward motion being sufficient to produce a constant but slow renewal of the material of said face.

5. As a new organization of apparatus elements for filtering turbid liquids, a casing, means at the top of the casing for continuously admitting sand thereto, means at the bottom of the casing for continuously removing sand therefrom, means near the top of the casing for removing filtered liquid, distributing means adjacent but above the bottom of the casing for admitting liquid to be filtered, such distributing means comprising an open bottomed chamber adapted to form a pocketed upwardly presented filtering face in the sand and to direct incoming liquid downwardly through said face and means for admitting turbid liquid to be filtered to such chamber under pressure.

6. In an apparatus of claim 5, an ejector mounted in the sand outlet, for removing the sand.

7. In an apparatus of claim 5, a distributing chamber having a conical form and axially located with regard to the outer casing.

8. In an apparatus of claim 5, a distributing chamber having an inverted trough form and peripherally located as regards the column of sand.

9. In an apparatus of claim 5, a distributing chamber having an inverted trough form and transversely located as regards the column of sand.

10. An apparatus according to claim 5 in which the means at the top of the casing for admitting sand thereto is a zigzag conduit.

11. The process of filtering which comprises establishing and maintaining a downwardly moving body of granular filtering material, establishing and maintaining a pocket at a relatively low point in said body, the lower face of the pocket being defined by some of the granular material, causing a gradual downward axial displacement of the material immediately under the pocket, and supplying less contaminated material from that surrounding the pocket and traveling thereover, delivering liquid under pressure to the pocket to percolate downwardly through the lower face thereof for primary filtration of such liquid and causing the primarily filtered liquid to rise through the upper portion of said downwardly moving body of material for secondary filtration, discharging said liquid from said material at a relatively high point thereof and constantly removing contaminated filtering material from a point in said moving body below said pocket.

12. In a process of filtering turbid liquid, the steps which comprise establishing and maintaining a downwardly moving column of sand under pressure, forming and maintaining pockets in said column of sand for introducing and for withdrawing liquid, introducing turbid liquid into a pocket in the lower portion of said column, removing filtered liquid from a pocket in the upper portion of said column, and removing a mixture of sand and filtered residues from the bottom of said column, the introduction and removal of sand and liquids being so correlated as to form efficient filtering faces in contact and adjacent to the pocket into which turbid liquid is introduced.

13. In filtering turbid liquids the process which comprises establishing and maintaining a columnar body of compacted granular filtering material in downward movement, applying pressure to said body at a high point in said column, establishing and maintaining an upwardly presented filtering surface of constantly renewed granular material in said column derived from a low point in said column, delivering turbid liquid under pressure downwardly to and through said filtering surface and thence upwardly in countercurrent to the downwardly moving compacted filtering material and removing filtered liquid from the column at a point below the point at which pressure is applied to said column.

ROY D. ELLIOTT.
MARY J. ELLIOTT.